H. N. LANDAAL.
JUNCTION BOX.
APPLICATION FILED JULY 19, 1912.
1,055,922.
Patented Mar. 11, 1913.
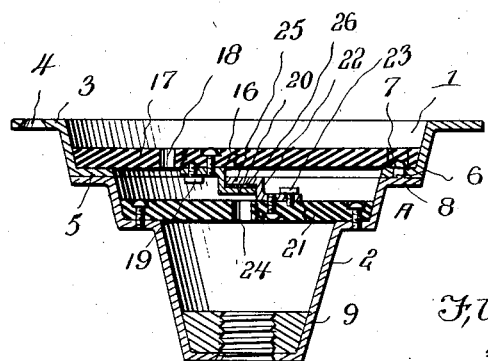
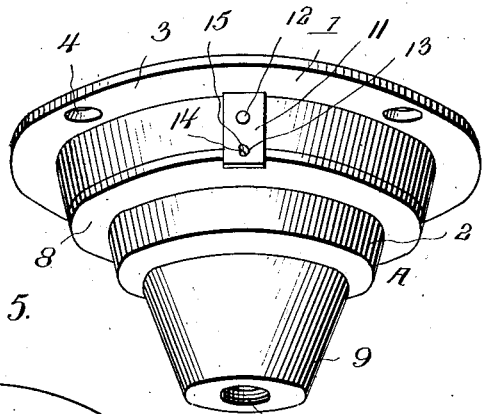
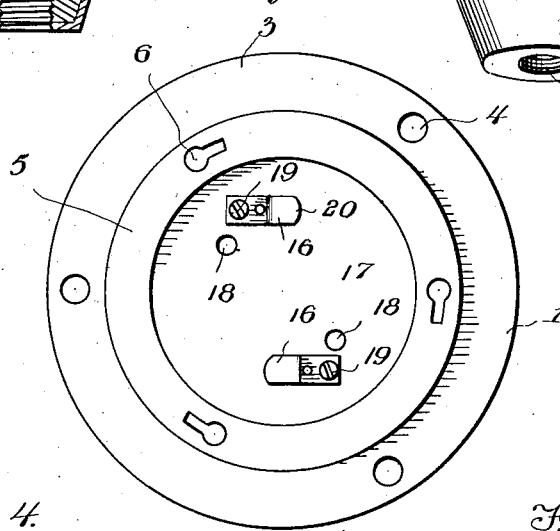
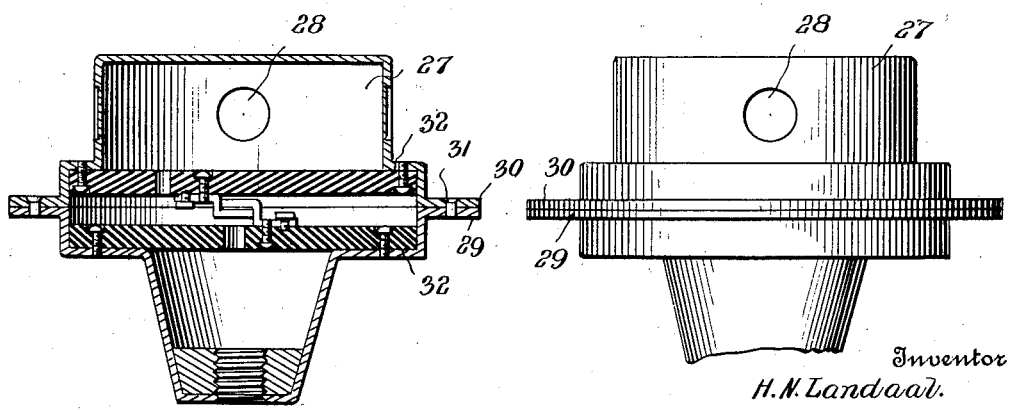
Witnesses
William Smith
John J. McCarthy
Inventor
H. N. Landaal.
By Victor J. Evans
Attorney

UNITED STATES PATENT OFFICE.

HENRY N. LANDAAL, OF HORICON, WISCONSIN.

JUNCTION-BOX.

1,055,922.  Specification of Letters Patent.  Patented Mar. 11, 1913.

Application filed July 19, 1912. Serial No. 710,462.

*To all whom it may concern:*

Be it known that I, HENRY N. LANDAAL, a citizen of the United States of America, residing at Horicon, in the county of Dodge and State of Wisconsin, have invented new and useful Improvements in Junction-Boxes, of which the following is a specification.

This invention relates to improvements in junction boxes for electric current carrying conductors and has particular application to a box of the type set forth for use in supporting electric lamp fixtures and receiving the electric current carrying wires.

In carrying out the present invention, it is my purpose to provide a junction box which will be constructed in such manner that the removal of the fixture from an operative position, will automatically break the circuit and disconnect the wires of the fixture from those leading from the mains.

It is also my purpose to provide a junction box which will embrace among other features a supporting section and a fixture section adapted for detachable connection with each other whereby the fixture section may be applied to the fixture and the supporting section applied to the support independently of one another so that the sections may be assembled or connected in box formation with ease and facility and without resorting to splicing of the wires to effect a path for the current from the wires of the mains to those of the fixture.

Furthermore, I aim to provide a junction box which will embrace, in its construction, the desired features of simplicity, efficiency and durability coupled with cheapness of cost in manufacture and installation and which is convenient and reliable in use.

With the above and other objects in view, the invention consists in the construction, combination and arrangement of parts hereinafter set forth and falling within the scope of the claims.

In the accompanying drawing; Figure 1 is a perspective view of a junction box constructed in accordance with the present invention. Fig. 2 is a central vertical sectional view of the same. Fig. 3 is a side elevation of a modified form of box, and Fig. 4 is a vertical central sectional view of the form of box illustrated in Fig. 3. Fig. 5 is a bottom plan view of the supporting section of the junction box.

Referring now to the accompanying drawing in detail, and particularly to the form of my invention illustrated in Figs. 1 and 2, the letter A designates my improved junction box as an entirety which may be made of any suitable material and consists of a supporting section 1 and a fixture section 2, the latter being adapted for detachable connection with the former. The section 1, in the present instance, is provided with a marginal flange 3 formed with apertures 4 suitably spaced apart and designed to receive screws, bolts or the like whereby the supporting section may be attached to the ceiling or molding block or other convenient support. The supporting section 1 is also formed with an inwardly extending flange 5 provided with key hole slots 6 suitably spaced apart and designed to receive headed rivets, bolts or the like 7 carried by a marginal flange 8 on the fixture section 2 whereby the fixture section may be attached to and removed from the supporting section. The fixture section 2, in the present instance, has the main body portion thereof tapered as at 9 and terminating in a threaded opening 10 designed to receive the fixture tube.

Any suitable form of locking means may be employed to prevent accidental movement of the sections after the same have been assembled in box formation. In the present instance, I employ, for this purpose, a spring finger 11 suitably fastened to the supporting section as by a rivet 12 and formed with an aperture 13 adjacent to the peripheral edge of the marginal flange 8 on the section 2 and adapted to receive a locking pin 14 provided with a beveled extremity 15, the latter serving to lift the spring finger in the turning movement of the fixture section relatively to the supporting section so that the pin may enter the aperture in the finger when such aperture and pin aline with each other.

In order to make and break the circuit when the fixture section is connected to and disconnected from the supporting section, respectively, and to insure a proper electrical contact, I employ complementary contacts carried by the sections of the junction box and designed to interlock with one another when the sections are assembled. The contacts carried by the supporting section 1 of the box are indicated by the numerals 16, 16 and are suitably fastened to an insulated disk 17 resting upon and secured to the inwardly extending flange 5, the latter being formed with apertures or openings 18 for the current carrying wires leading from the main, the terminals of such wires being fastened to binding screws 19 secured to one end of each contact 16, while the opposite or free ends of such contacts are offset as at 20. Suitably fastened within the main body portion of the fixture section 2, is a disk 21 constructed of suitable insulating material and equipped with contacts 22, 22 suitably fastened thereto, one extremity of each contact 22 being provided with a binding post 23 to receive the respective fixture wires, the wires being passed through an aperture 24 in the disk, while the opposite ends of the contacts are offset as at 25 and provided with spring fingers 26 adapted to interlock with the offset portions of the contacts 16, 16 thereby insuring good electrical contact between the wires leading from the mains and the fixture wires.

In the modified form of my invention shown in Figs. 3 and 4, the upper or supporting section of the junction box is in the form of an inverted cup-shaped section 27 formed at diametrically opposite points with apertures 28 designed to accommodate the free ends of conduits carrying electric wires, while the fixture section of the box is substantially the same as that hereinbefore described and has a marginal flange 29 formed with apertures suitably spaced apart and alining with apertures in a marginal flange 30 on the fixture section to receive rivets or the like 31, whereby the fixture section may be fastened to the supporting section after such sections have been assembled in box formation. In this form of my invention, both sections of the fixture are formed in such manner as to provide walls 32, 32, each wall having bolted or otherwise secured thereto the respective contact carrying disk. The form of box illustrated in Figs. 3 and 4 is particularly designed for conduit work.

From the foregoing description taken in connection with the accompanying drawing, the construction and manner of employing my invention will be readily apparent. It will be noted that I have provided a junction box wherein one section may be fastened to the ceiling or other support and the terminals of the wires leading from the mains connected thereto, while the other section thereof may be fastened to the fixture and the fixture wires secured to the contacts carried thereby, thereby enabling the sections to be assembled in box formation and a circuit made simultaneously.

While I have herein shown and described certain particular embodiments of my invention by way of illustration, I desire to have it understood that I do not limit myself to the precise details of construction herein described and delineated, as modification and variation may be made within the scope of the claims and without departing from the spirit of the invention.

I claim:

1. A junction box comprising a supporting section provided with an inwardly extending flange having key hole slots formed therein and spaced apart, a fixture section provided with a marginal flange, bolts carried by the last-named flange and spaced apart and adapted to be inserted in the key hole slots in the first-mentioned flange to form a detachable connection between said sections, insulating disks carried by said sections and spaced apart, complementary contacts carried by the confronting faces of said insulating disks and adapted to interlock in the assembling of the sections, and means for locking the sections against accidental movement.

2. A junction box comprising a supporting section provided with an inwardly extending flange having key hole slots formed therein and spaced apart, a fixture section provided with a marginal flange, bolts carried by the last-named flange and spaced apart and adapted to be inserted in the key hole slots in the first-mentioned flange to form a detachable connection between said sections, insulating disks carried by said sections and spaced apart, complementary contacts carried by the confronting faces of said insulating disks and adapted to interlock in the assembling of the sections, means for locking the sections against accidental movement, said last-named means including a spring finger carried by said supporting section and provided with an aperture, and a locking pin carried by said fixture section and having a beveled end adapted to lift said finger and enter the aperture therein.

In testimony whereof I affix my signature in presence of two witnesses.

HENRY N. LANDAAL.

Witnesses:
E. M. SCHNEIDER,
F. W. PISCHKE.